US008036964B2

(12) United States Patent
Savasoglu et al.

(10) Patent No.: US 8,036,964 B2
(45) Date of Patent: Oct. 11, 2011

(54) SYSTEMS AND METHODS FOR REMARKETABLE FIXED INCOME SECURITIES

(75) Inventors: Serkan Savasoglu, New York, NY (US); Kevin G. Woodruff, New York, NY (US); Nathan McMurtray, New York, NY (US)

(73) Assignee: Morgan Stanley, New York, NY (US)

( * ) Notice: Subject to any disclaimer, the term of this patent is extended or adjusted under 35 U.S.C. 154(b) by 1563 days.

(21) Appl. No.: 10/703,975

(22) Filed: Nov. 7, 2003

(65) Prior Publication Data

US 2005/0102207 A1    May 12, 2005

(51) Int. Cl.
    *G06F 17/60* (2006.01)
(52) U.S. Cl. ............................ 705/35; 705/36 R; 705/37
(58) Field of Classification Search ................. 705/36 R, 705/36 T, 35, 38
    See application file for complete search history.

(56) References Cited

U.S. PATENT DOCUMENTS

| | | | | |
|---|---|---|---|---|
| 4,839,804 A * | 6/1989 | Roberts et al. | ............... | 705/36 R |
| 5,832,461 A * | 11/1998 | Leon et al. | ........................ | 705/38 |
| 5,870,720 A * | 2/1999 | Chusid et al. | .................... | 705/38 |
| 5,930,777 A | 7/1999 | Barber | | |
| 5,946,667 A * | 8/1999 | Tull et al. | ..................... | 705/36 R |
| 6,148,293 A * | 11/2000 | King | ................. | 705/35 |
| 6,263,321 B1 * | 7/2001 | Daughtery, III | ............ | 705/36 R |
| 6,321,212 B1 | 11/2001 | Lange | | |
| 7,219,079 B2 * | 5/2007 | Birle et al. | .................... | 705/36 T |
| 7,222,094 B2 * | 5/2007 | Ross | ........................... | 705/36 R |
| 7,236,955 B2 | 6/2007 | Sugahara | | |
| 7,249,083 B2 * | 7/2007 | Noraev et al. | ................ | 705/36 R |
| 7,257,555 B1 * | 8/2007 | Farr | ............................. | 705/36 R |
| 7,257,556 B1 * | 8/2007 | Rifkin | .......................... | 705/36 R |
| 7,305,362 B2 * | 12/2007 | Weber et al. | ................. | 705/36 R |
| 2002/0052819 A1 * | 5/2002 | Burton | ............................ | 705/36 |
| 2002/0103852 A1 | 8/2002 | Pushka | | |
| 2002/0120542 A1 | 8/2002 | Higgins | | |
| 2002/0133456 A1 | 9/2002 | Lancaster et al. | | |
| 2002/0138382 A1 * | 9/2002 | Seaman | .......................... | 705/36 |
| 2002/0147670 A1 * | 10/2002 | Lange | ............................ | 705/35 |
| 2002/0178111 A1 | 11/2002 | Woodley | | |
| 2003/0009406 A1 * | 1/2003 | Ross | ............................... | 705/36 |
| 2003/0130941 A1 | 7/2003 | Birle, Jr. et al. | | |
| 2003/0182219 A1 | 9/2003 | Bodurtha et al. | | |
| 2003/0225656 A1 | 12/2003 | Aberman et al. | | |
| 2003/0233313 A1 | 12/2003 | Bartolucci | | |
| 2004/0133494 A1 | 7/2004 | Jones et al. | | |
| 2004/0153388 A1 | 8/2004 | Fisher et al. | | |
| 2004/0193521 A1 * | 9/2004 | Smith et al. | ..................... | 705/35 |

(Continued)

OTHER PUBLICATIONS

Spivak Wo/2005/077059 Method and system for structured finance using defferrable preferred securities. Sep. 2, 2005.*

(Continued)

*Primary Examiner* — Thomas Dixon
*Assistant Examiner* — Gerald Vizvary
(74) *Attorney, Agent, or Firm* — K&L Gates LLP (57) ABSTRACT

A straight debt security may include a maturity component, a reset component, and a remarketing component. In general, the maturity component provides a maturity term of the straight debt security. The reset component specifies the terms and conditions for resetting a yield on the straight debt security. The remarketing component provides terms and conditions for remarketing the straight debt security to new investors. After remarketing, the straight debt security remains outstanding and potential recapture of excess tax benefits is postponed until the straight debt security ceases to be outstanding.

9 Claims, 4 Drawing Sheets

U.S. PATENT DOCUMENTS

| | | |
|---|---|---|
| 2004/0193536 A1 | 9/2004 | Marlowe-Noren |
| 2005/0033674 A1* | 2/2005 | Jones et al. ..................... 705/35 |
| 2005/0075959 A1 | 4/2005 | Woodruff et al. |
| 2005/0075976 A1 | 4/2005 | Woodruff et al. |
| 2005/0102213 A1 | 5/2005 | Savasoglu et al. |
| 2005/0160025 A1* | 7/2005 | Birle et al. ..................... 705/37 |
| 2006/0212380 A1 | 9/2006 | Williams et al. |
| 2006/0218069 A1 | 9/2006 | Aberman et al. |

OTHER PUBLICATIONS

Internal Revenue Service Revenue Ruling 2003-97, Deductibility of Interest, published Aug. 25, 2003, pp. 1-9.
Internal Revenue Service Revenue Ruling 2002-31, Published May 6, 2002, Section 1275—Other definitions and special rules, 26 CFR 1.1275.4, contingent payment debt instruments, pp. 1-4.
Faerber, Esme, All About Bonds and Bond Mutual Funds: The Easy Way to Get Started, New York McGraw-Hill Professional, 200, pp. 28, 40, 225, 226, 236, 2000.
Downes, John & J.E. Goodman, Barron's Dictionary of Finance and Investment Terms, 1998, 5th Edition, pp. 695 and 607, 1998.
Office Action issued on Sep. 18, 2007 in U.S. Appl. No. 10/703,978.
Office Action issued on Sep. 27, 2007 in U.S. Appl. No. 10/677,172.
Treasury and Internal Revenue Service, Jul. 23, 2003, Rev. Rul. 2003-97.
Craig, Pirrong, "Manipulation of Cash-Settled Futures Contracts", JSTOR: The Journal of Business, vol. 74, No. 2, (2001), pp. 224, 2001.
Prospectus Supplement, Public Service Enterprise Group Incorporated (PSEG) Sep. 5, 2002.
Prospectus Supplement, The Hartford Financial Services Group, Inc., Sep. 9, 2002.
U.S. Appl. No. 10/677,172, Oct. 2, 2003.
Office Action issued on Apr. 15, 2008 in U.S. Appl. No. 10/677,172.
Office Action issued on Jul. 31, 2007 in U.S. Appl. No. 10/679,054.
Office Action issued on Jan. 23, 2008 in U.S. Appl. No. 10/679,054.
Office Action issued on Jul. 22, 2008 in U.S. Appl. No. 10/679,054.
Office Action issued on Aug. 3, 2007 in U.S. Appl. No. 10/679,071.
Office Action issued on Jan. 9, 2008 in U.S. Appl. No. 10/679,071.
Office Action issued on Aug. 20, 2008 in U.S. Appl. No. 10/679,071.

* cited by examiner

SYSTEMS AND METHODS FOR REMARKETABLE FIXED INCOME SECURITIES

TECHNICAL FIELD

The present invention relates generally to investment instruments and, more particularly, to systems and methods for enhancing fixed-income investment securities.

BACKGROUND

Firms traditionally issue conventional securities such as straight debt and common stock in order to raise capital. In general, straight debt securities (e.g., bonds, notes, loans, mortgages) enable firms to raise capital by borrowing and promising to repay a principal amount and interest on a specified future dates. Common stock securities, on the other hand, enable firms to raise capital by selling an equity interest in the firm. Owners of common stock typically receive voting rights regarding firm matters and may benefit through appreciation of the stock value and/or receiving dividends.

In addition to conventional types of securities, firms have a variety of more sophisticated hybrid investment instruments at their disposal. Hybrid securities may have attributes of several different types of securities (e.g., debt components and equity components) and may change optionally or automatically at certain points in time or depending on market conditions. Convertible securities, such as convertible debt, provide the issuer and/or the holder with the option of exchanging the convertible securities for other related securities, such as common stock. Convertible securities may be attractive to investors due to the mix of features, for example, earning interest like bonds when the stock price is down or flat and increasing in value like common stock when the stock price rises.

In some cases, a convertible security includes a contingent interest feature, in which additional interest is payable upon the occurrence of a specified condition. For example, the convertible security may provide contingent interest payments if the trading price of the bonds for each of the five trading days ending on the trading day prior to the first day of a period over which contingent interest may be payable is greater than or equal to 120% of the par amount for cash-pay bonds (i.e. bonds that pay interest) or 120% of the accreted principal amount for zero-coupon (i.e. bonds that do not pay interest) or discount bonds (i.e. bonds that pay interest and have an accreting principal amount). The first period for which a contingent interest may be paid may be the six-month period starting on the first date the bonds become callable by the issuer. The contingent interest amount may be a fixed percentage of the average market price of the bonds on the five trading days prior to the first day of such six-month period.

For tax purposes, if the terms of a convertible security provide for contingent interest payments, the issuer may take tax deductions based on the yield it would pay on a fixed-rate nonconvertible debt instrument with terms and conditions similar to those of the convertible security ("comparable yield"). The deductions are based on a schedule of projected payments with respect to the convertible security ("projected payment schedule"). The projected payment schedule is designed to produce a yield equal to the comparable yield. For accounting purposes, the issuer of the convertible security may need to establish deferred tax liability and deferred tax expense entries.

In every annual tax reporting period, for tax purposes, the issuer deducts a value equal to the tax adjusted issue price as of the beginning of the period times the comparable yield. The "tax adjusted issue price" as of the end of every period is the tax adjusted issue price as of the beginning of the period (issue price if the period is the first period), plus the tax adjusted issue price as of the beginning of the period times the comparable yield, minus any non-contingent and projected contingent cash payments to be made during the period. Deductions are adjusted upward or downward if the actual contingent interest paid is greater or less than that projected under the projected payment schedule. The tax adjusted issue price when the convertible ceases to be outstanding is compared to the value of securities and/or cash delivered to the holders to determine if the tax deductions are permanent.

By including a contingent interest feature, issuers can claim tax deductions in excess of the stated yield on the convertible security. Excess deductions may be recaptured as income if the issuer does not ultimately deliver to the holders securities with a value equal to or greater than the tax adjusted issue price at the time the convertible security ceases to be outstanding.

Typically, a straight debt (i.e. nonconvertible debt) security does not qualify for contingent payment debt instrument (CPDI) tax treatment. This is because straight debt instruments are usually based on either a fixed interest rate or a floating interest rate (e.g., the London Interbank Offered Rate (LIBOR), the swap rate, or some other benchmark interest rate). Straight debt instruments that include variable (i.e., floating) interest rates are generally treated as variable rate debt instruments (VRDI) and excluded from CPDI treatment.

It may be advantageous to an issuer, however, if a straight debt security could qualify for CPDI treatment. The following sets forth systems and methods for providing CPDI treatment for straight debt investment securities.

SUMMARY

In one general aspect one type of straight debt security includes a maturity component, a reset component and a remarketing component. In general, the maturity component provides a maturity term of the straight debt security. The reset component specifies the dates at which the yield on the straight debt security will be reset and methods with which the yield on the straight debt security will be reset. The remarketing component provides terms and conditions for remarketing the straight debt security to new investors. After remarketing, the straight debt security remains outstanding and the potential recapture of excess tax benefit detriment is postponed until the final maturity date or earlier redemption.

In another general aspect, a method may include issuing a straight debt security to a holder and reoffering, at a remarketing time, the straight debt security to one or more new investors.

In yet another aspect, a computer system may include an issuing agent (e.g. underwriter) and a remarketing agent. The issuing agent may issue a straight debt security to a holder. The remarketing agent may offer, at a remarketing time, the straight debt security to one or more new investors.

Aspects of the present invention may be implemented by a computer program stored on a computer readable medium. The computer readable medium may comprise a disk, a device, and/or a propagated signal. Other features and advantages will be apparent from the following description, including the drawings, and from the claims.

DETAILED DESCRIPTION

The present invention is directed to structures, methods, and systems for remarketing straight debt investment securities. For simplicity, the basic components of such structures, methods, and systems are provided. However, as would be understood by one of ordinary skill in the art, the structures, systems and methods described below may include various other components, elements, and/or processes in actual implementation.

Figure 1:
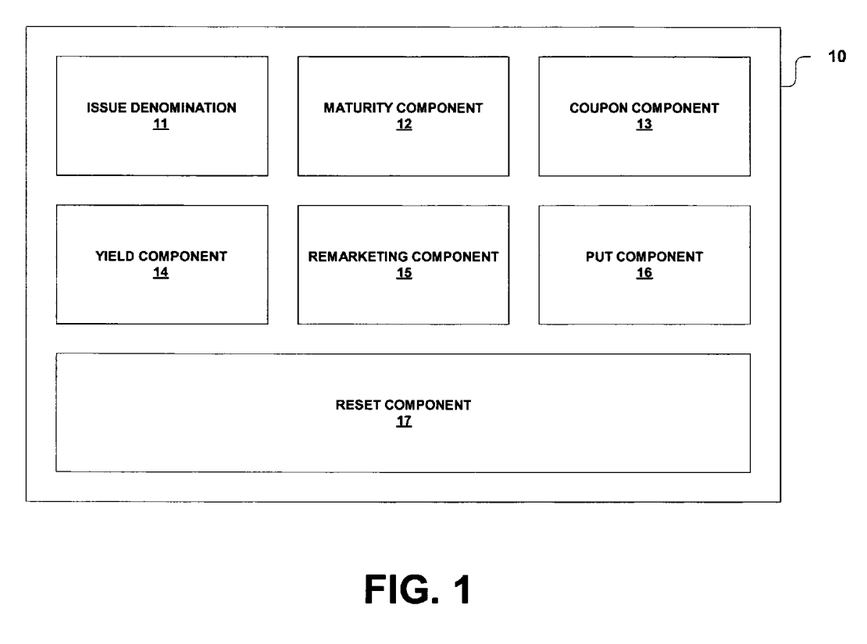
FIG. 1 illustrates a straight debt security according to one embodiment of the present invention.

FIG. 1 illustrates one embodiment of a straight debt security 10 according to aspects of the present invention. The straight debt security 10 may be embodied as one or more paper and/or electronic documents and generally may contain one or more legal rights and obligations in the context of a financial transaction. In many cases, the straight debt security 10 may form part of an offering by a company and may be listed on a national securities exchange.

Examples of straight debt securities 10 include bonds, notes, loans, and mortgages, for example. In one embodiment, the debt security 10 includes a principal amount and a specified interest rate. The debt security 10 (e.g., cash-pay bond, discount bond) may pay interest at a fixed rate or floating rate according to a coupon frequency, such as in quarterly payments, for example. Alternatively, the debt security 10 may be structured to have no coupon but pay a yield in the form of accretion of the principal amount In some cases, the debt security 10 may be implemented as a subordinated deferrable interest note, which by definition, is subordinate to senior debt of the issuer and provides an interest rate deferral option to the issuer. The deferrable interest clause may allow the issuer to defer interest payments for any reason before the maturity date. An issuer may desire to use subordinated/deferrable notes in order to achieve a certain credit rating.

In one implementation, the straight debt security 10 includes an issue denomination 11 (i.e. issue price or initial principal amount) and a maturity component 12. The issue denomination 11 is the face value (e.g., $1000 par value) of the convertible security 10. In general, the maturity component 12 indicates the term or life of the straight debt security 10. The maturity component typically may express the term as a number of years (e.g., 30 years) from the issue date. In some cases, the maturity component 12 provides the date at which the straight debt security 10 becomes due for payment.

As shown, the straight debt security 10 also may include a coupon component 13 and/or a yield component 14. If present, the coupon component 13 may specify, at the time of issue, that interest payments are to be made at a particular rate and at a particular frequency (e.g., quarterly). In some embodiments, the straight debt security 10 may be a zero-coupon security (e.g., zero-coupon bond with no coupon component). In other embodiments, the coupon component 14 may base the particular interest rate on the LIBOR, or some other variable rate. The interest payment may also be a fixed rate. In some cases, the interest rate may be expressed as a percentage of the issue price or the accreted principal amount. The "accreted principal amount" at the end of an annual period is equal to the accreted principal amount at the beginning of the period (issue price if the period is the first period), plus the accreted principal amount at the beginning of the period multiplied by the yield, minus any cash payments to be made during the period. The principal amount will be increased daily based on the relevant yield, which may be reset periodically.

In general, the yield component 14 may specify, at the time of issue, an annual rate of return. The yield component 14 typically is expressed as a percentage and may be a fixed value or based on the LIBOR, or some other variable rate.

The straight debt security 10 may include a remarketing component 15. In one embodiment, the remarketing component 15 specifies, at the time of issue, the terms and conditions for remarketing the straight debt security 10 to new investors. The remarketing component 15 may include one or more remarketing dates.

In some implementations, a company may contract with a remarketing agent (e.g., investment bank) to remarket the straight debt security 10. The remarketing agent may receive a remarketing fee, for example, of one quarter of one percent of a minimum selling price. In some cases, the straight debt security 10 may be remarketed at a premium with the remarketing fee paid to the remarketing agent out of the proceeds, or the security may be remarketed at face value with the remarketing fee paid directly to the remarketing agent by the issuer.

In one embodiment, the straight debt security 10 will be remarketed periodically (e.g., annually). In order to optimize the remarketing at the outset, the straight debt security 10 may include built-in provisions regarding the structure of the remarketing. In implementation, the straight debt security 10 is remarketed as a new one-year straight debt security. The one-year debt may be remarketed as a zero-coupon debt or as cash-pay debt (i.e., debt that pays a coupon).

In some cases, the remarketed security may be senior or subordinated and may or may not include deferrable interest. By definition, subordinate debt is junior to senior debt of the issuer and a deferrable interest clause may allow the issuer to defer interest payments for any reason before the maturity date. An issuer may use subordinated/deferrable notes in order to achieve a certain credit rating, for example.

In one implementation, at remarketing, the coupon or yield of the security is changed to enable the remarketed security (e.g., debt security) to be sold for an amount equal to a minimum price. For example, the coupon or yield may be adjusted according to market conditions to ensure that the debt trades at par or an accreted principal amount. The rates may be effective for the remaining term of the remarketed security, until the next remarketing date or may change in response to certain time or market conditions.

The straight debt security 10 may include a put component 16. In one embodiment, the put component 16 specifies, at the time of issue, the terms and conditions (e.g., price, dates) under which the holder has the right to sell the security back to the issuer. For example, the put component 16 may provide that in the event of an unsuccessful remarketing, the holder can put the security (e.g., bond) for an amount equal to the accreted principal amount. Putting the straight debt security 10 generally may involve the holder providing a put notice to the issuer and delivering the bond in exchange for the specified amount.

In general, the straight debt security 10 may be structured so that the issuer has no call option. However, there may be no provisions that would prohibit the issuer from purchasing the debt security 10 in a remarketing. In some embodiments, however, the straight debt security 10 may include a call component that specifies, at the time of issue, certain conditions under which the issuer may call the straight debt security 10 prior to maturity.

In general, calling the security involves redeeming the security for a price. A company may call a bond, for example, when market interest rates fall so that retiring the existing bond and issuing a new bond at a lower yield is advantageous to the company. The call component may specify an initial time period in which the security cannot be called. For example, the call component may specify, at the time of issue, that the security cannot be called for an initial five-year period.

As shown in FIG. 1, the straight debt security 10 also includes a reset component 17. In one embodiment, the reset component 17 specifies how and when the yield on the straight debt security 10 will be reset. For example, the reset component 17 may specify a formula for resetting the yield of the straight debt security 10. In addition, the method of resetting the yield may be structured and arranged such that the straight debt security 10 (e.g., debt instrument) must be treated as a CPDI.

Figure 2:
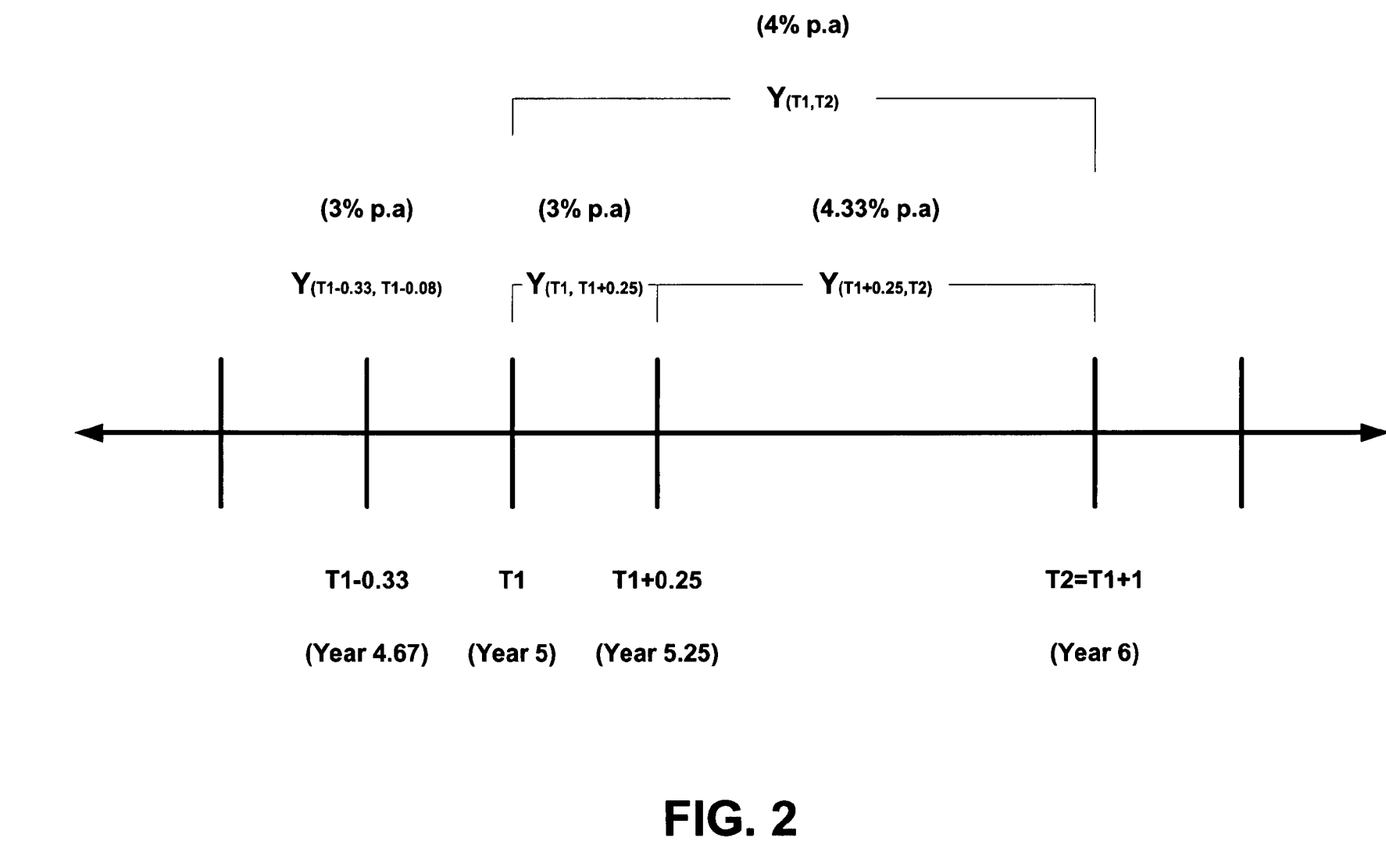
FIG. 2 illustrates a reset feature according to one embodiment of the present invention.

Referring to FIG. 2, a reset feature according to one embodiment of the present invention is shown. For purposes of illustration, it is assumed that a straight debt security includes a maturity component 12 providing a thirty-year term and a remarketing component 15 providing that remarketing is to occur every year.

In this example, it is further assumed that investors are willing to purchase a remarketed one-year debt instrument at a time T1 (e.g., Year 5) and hold it until time T2 (e.g., Year 6) for a certain total yield ($Y_{T1,T2}$). At time T1, the yield for the upcoming first quarter of the year ($Y_{T1,T1+0.25}$) is set to the 3-month LIBOR in effect at time T1–0.33 (e.g., Year 4.67), i.e., 0.33 years (approximately 4 months) earlier. The yield for the remainder of the year following the first quarter ($Y_{T1+0.25,T2}$), i.e., the plug rate, is set so that when combined with the yield in the first quarter of the year ($Y_{T1,T1+0.25}$), the total yield from T1 to T2 is equal to $Y_{T1,T2}$, which is the yield investors would like to be paid from time T1 to time T2.

For example, if the total yield ($Y_{T1,T2}$) that investors would like to be paid from time T1 to time T2 is 4% and the 3-month LIBOR in effect approximately four months before time T1 was 3%, the yield for the upcoming quarter ($Y_{T1,T1+0.25}$) is set to 3% and the plug rate ($Y_{T1+0.25,T2}$) is set to 4.33%. As a result, the net effect or compound rate for the year from time T1 to time T2 is 4%, i.e., the total yield ($Y_{T1,T2}$).

The CPDI Regulations apply to the notes because the accreted principal amount is uncertain. Moreover, when the yield is reset at time T1, the yield for the three-month period after time T1 is set to a rate in effect at least three months earlier than time T1. Therefore, the straight debt security 10 is not a considered VRDI under the tax code. Consequently, the straight debt security 10 qualifies for treatment as a CPDI under the tax code.

In one embodiment, a company thus may pay the current rate (or yield) every year, but take a deduction based on the long-term maturity (e.g., 30-year term) of the straight debt security 10. In another embodiment, the straight debt security 10 may have no coupons, but the yield may increase the accreted principal amount.

In general, the reset component 17 is structured such that the straight debt security 10 must be treated as a CPDI under the tax code. For example, interest may accrue as if the CPDI were a fixed-payment debt instrument. This is known in the tax code as the "noncontingent bond method."

In one implementation, application of the noncontingent bond method involves determining the comparable yield and a projected payment schedule for the straight debt security 10. The comparable yield for the straight debt security 10 can be the yield at which a fixed rate debt instrument having similar terms and conditions would be issued. Such terms and conditions may relate to maturity, payment frequency, subordination level, and market conditions, for example. In all cases, the comparable yield must be reasonably determined by the issuer. In some situations, the comparable yield may be set to the applicable Federal rate (AFR).

The projected payment schedule for the straight debt security 10 generally will include each noncontingent payment and a projected amount for each contingent payment. Adjustments may be made to ensure that the projected payment schedule produces a yield that is equal to the comparable yield.

Application of the noncontingent bond method also involves determining the interest amount for an accrual period, such as a taxable year. In general, the amount of interest for an accrual period is the product of the comparable yield and the tax adjusted issue price of the straight debt security as of the beginning of the accrual period. The "tax adjusted issue price" as of the end of an annual period is the tax adjusted issue price as of the beginning of the period (issue price if the period is the first period), plus the tax adjusted issue price as of the beginning of the period multiplied by the comparable yield, minus any non-contingent and projected contingent cash payments to be made during the period. Typically, the holder treats the interest as taxable income, and the issuer treats the interest as a deduction.

Application of the noncontingent bond method also may involve adjusting the amount of income or deductions. In some situations, the actual contingent payments may differ from the projected contingent payments. Accordingly, appropriate adjustments must be made to reflect the difference. When the actual amount of the contingent payments is greater than the projected amount, a positive adjustment is made. A net positive adjustment generally is treated as interest and is included in income by the holder of the instrument. The net positive adjustment is deductible by the issuer in the taxable year in which the adjustment occurs.

When the actual amount of the contingent payments is less than the projected amount, however, a negative adjustment is made. A net negative adjustment generally reduces interest accruals on the debt instrument for the taxable year. However, there may be certain limitations if the net negative adjustment exceeds the interest for the taxable year.

Typically, the issue of recapture arises when a security ceases to be outstanding (e.g., matures or is retired). The term "recapture" generally refers to the event when the issuer pays taxes on excess tax deductions when the value of securities and/or cash delivered to the holders is less than the tax adjusted issue price when the debt security ceases to be outstanding.

When the security ceases to be outstanding, the tax adjusted issue price is compared to the value of the securities and/or cash delivered to the holders. If the tax adjusted issue price is less than the value of the securities and/or cash delivered to the holders, the issuer may pay tax on the difference between the tax adjusted issue price and the value of the securities and/or cash delivered.

In one implementation, the comparable yield is determined in accordance with the maturity component 12 of the straight debt security 10. For example, if the maturity component 12 specifies a thirty-year term, the comparable yield will be determined with reference to a thirty-year fixed-rate instrument. By remarketing the security multiple times until maturity, a company is in fact utilizing the full term of the straight debt security 10. The straight debt security 10 remains outstanding until maturity. If interest rates are upward sloping, using the prevailing long-term rate for tax deductions may be more advantageous than using a short-term rate. If interest rates change such that keeping the straight debt security 10 outstanding and taking tax deductions based on the comparable yield is less attractive than issuing a new security, the company can provide the best bid at the next remarketing date and buy back the straight debt security 10.

When the straight debt security 10 is successfully remarketed to a new investor, the issuer and/or the remarketing agent may distribute the proceeds to the original investor. From the perspective of an original investor, this is satisfactory because the investor receives a payment based on the yield. From the perspective of a new investor, straight debt is purchased at favorable terms based on current market conditions.

From the perspective of the issuer, the straight debt security 10 is remarketed and remains outstanding. As a result, recapture, if any, is not triggered. While the straight debt security 10 remains outstanding, the issuer receives an ongoing timing benefit even if there is full recapture at maturity since it has deferred payments until maturity. In addition, the comparable yield may be determined with reference to a long-term fixed-rate instrument.

Figure 3:
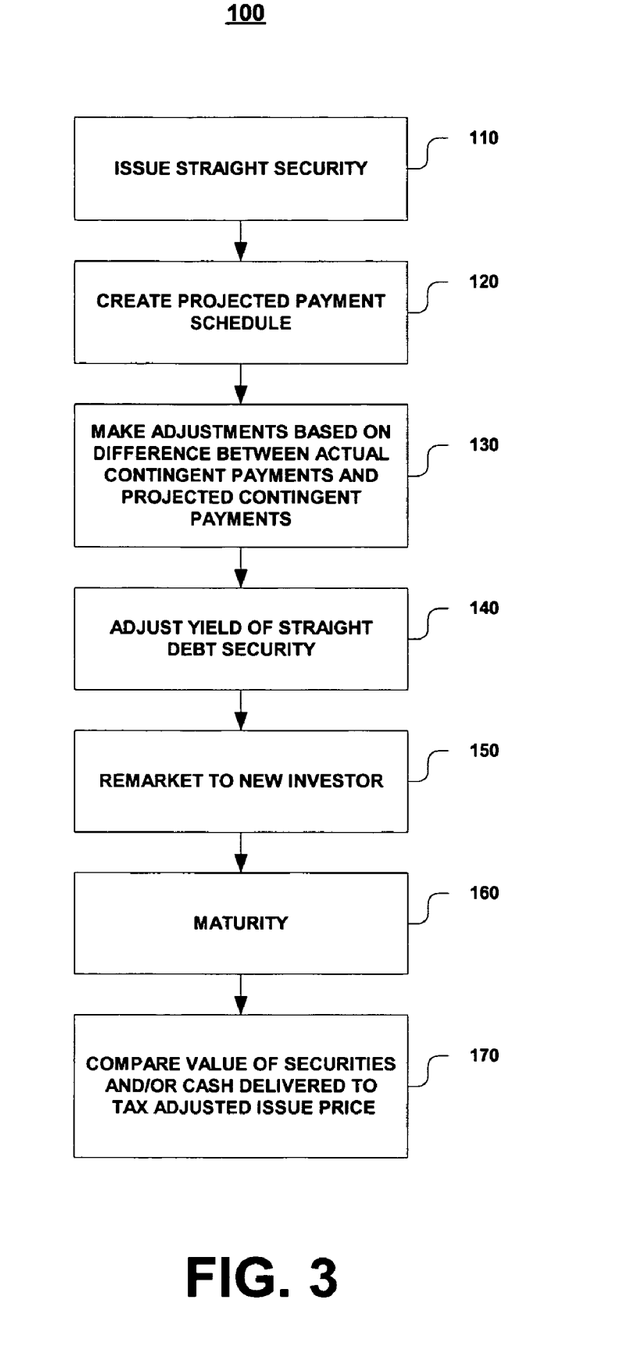
FIG. 3 illustrates a method according to one embodiment of the present invention.

FIG. 3 illustrates a flowchart of one embodiment of a method 100 according to aspects of the present invention. In general, the method 100 may include issuing a straight debt security (step 110), creating a projected payment schedule (step 120), making adjustments based on the difference between actual contingent payments and projected contingent payments (step 130), adjusting the yield of the straight debt security (step 140), remarketing the straight debt security to a new investor (step 150), maturity of the straight debt security (step 160), and comparing the value of the securities and/or cash delivered to the tax adjusted issue price (step 170).

At step 110, a straight debt security is issued. The straight debt security may be issued by a company and may be listed on a national securities exchange. One example of a straight debt security is a thirty-year zero-coupon bond. In general, the straight debt security has features that require it to be treated as a CPDI under the tax code.

In one implementation, the straight debt security includes a reset component. In one embodiment, the reset component specifies the dates at which the yield on the straight debt security will be reset and methods by which the yield on the straight debt security will be reset. For example, the reset component may specify a formula for resetting the yield of the straight debt security. In addition, the method by which the yield will be reset is structured and arranged such that the straight debt security avoids treatment as a VRDI. As a result, the straight debt security (e.g., debt instrument) must be treated as a CPDI subject to the noncontingent bond method described in the tax code.

At step 120, a projected payment schedule is created. This may occur at the time the straight debt security is issued. In one implementation, the projected contingent payments are based on the forward price and/or the expected value of the contingent payments as of the issue date. The comparable yield can be determined by referencing the yield of a fixed-rate debt instrument with terms and conditions similar to those of the straight debt security. The projected payment schedule may include each noncontingent payment and a projected amount for each contingent payment.

At step 130, the actual contingent payments may differ from the projected contingent payments. Accordingly, appropriate adjustments must be made to reflect the difference. These adjustments must be made when a projected contingent payment differs from an actual contingent payment at any time on or after the issue date and on or before the maturity date. When the actual amount of the contingent payments is greater than the projected amount, a positive adjustment is made. A net positive adjustment generally is treated as interest and is included in income by the holder of the instrument. The net positive adjustment is deductible by the issuer in the taxable year in which the adjustment occurs.

When the actual amount is less than the projected amount, however, a negative adjustment is made. A net negative adjustment generally reduces interest accruals on the debt instrument for the taxable year. However, there may be certain limitations if the net negative adjustment exceeds the interest for the taxable year.

At step 140, the yield of the straight debt security is reset. In one implementation, it is assumed that investors are willing to purchase a remarketed one-year debt instrument at a time T1 (e.g., Year 5) and hold it until time T2 (e.g., Year 6) for a certain total yield ($Y_{T1,T2}$). In this case, at time T1, the yield for the upcoming first quarter of the year ($Y_{T1,T1+0.25}$) is set to the 3-month LIBOR in effect at time T1−0.33 (e.g., Year 4.67), i.e., 0.33 years (approximately 4 months) earlier. The yield for the remainder of the year following the first quarter ($Y_{T1+0.25,T2}$), i.e., the plug rate, is set so that when combined with the yield in the first quarter of the year ($Y_{T1,T1+0.25}$), the total yield from T1 to T2 is equal to $Y_{T1,T2}$, which is the yield investors would like to be paid from time T1 to time T2.

For example, if the total yield ($Y_{T1,T2}$) that investors would like to be paid from time T1 to time T2 is 4% and the LIBOR in effect approximately four months before time T1 was 3%, the yield for the upcoming quarter ($Y_{T1,T1+0.25}$) is set to 3% and the plug rate ($Y_{T1+0.25,T2}$) is set to 4.33%. As a result, the net effect or compound rate for the year from time T1 to time T2 is 4%, i.e., the total yield ($Y_{T1,T2}$).

When the yield is reset at time T1, the yield for the three-month period after time T1 is set to a rate in effect at least three months earlier than time T1. Therefore, the straight debt security 10 is not a considered a VRDI under the tax code. Consequently, the straight debt security 10 qualifies for treatment as a CPDI under the tax code.

At step 150, the straight debt security is remarketed to new investors. The straight debt security may be remarketed as a new one-year straight debt security or as a new straight debt security with a longer maturity. In one embodiment, the straight debt security may be remarketed annually. In other embodiments, the straight debt security may be remarketed every five or ten years, for example.

In general, successful remarketing allows the issuer to leave the straight debt security outstanding. In some cases, multiple remarketings may maintain the straight debt security outstanding until the final maturity. As a result of remarketing, the potential recapture, if any, of excess tax benefits is postponed.

At step 160, the straight debt security ceases to be outstanding due to maturity or retirement.

At step 170, the tax adjusted issue price is compared to the value of the securities and/or cash delivered to the holders at maturity or redemption. If the tax adjusted issue price is less than the value of the securities and/or cash delivered to the holders, the issuer may pay tax on the difference between the tax adjusted issue price and the value of the securities and/or cash delivered.

Figure 4:
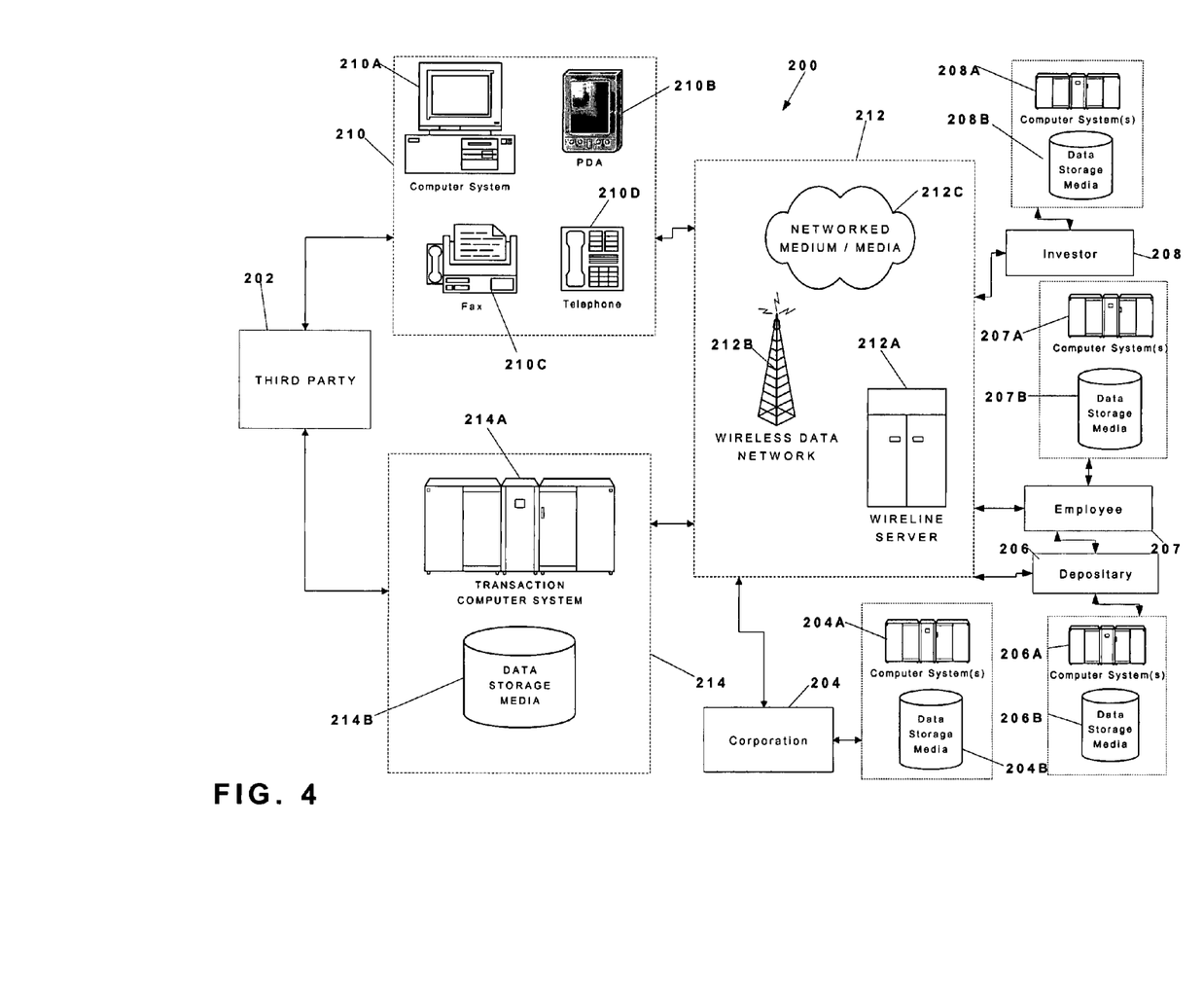
FIG. 4 illustrates a system according to one embodiment of the present invention.

FIG. 4 is a diagram illustrating one embodiment of a system 200 in which aspects of the present invention may be used. As shown, a third party 202 such as, for example, an underwriter, an investment bank, or an entity can communicate and/or exchange data with one or more of a corporation 204, a depository 206 (e.g. The Depository Trust Company), an employee 207 and/or an investor 208.

In one implementation, the depository 206 may assign a unique identification such as a Committee Uniform Securities Identification Procedures (CUSIP) number, for example, to each security approved for trading. The CUSIP number may be used to track buy and sell orders for the units during issue and/or remarketing.

In one aspect, the third party 202 can be operatively associated with one or more communications devices 210 such as, for example and without limitation, a computer system 210A, a personal digital assistant 210B, a fax machine 210C, and/or a telephone 210D (e.g. a wireline telephone, a wireless telephone, a pager, and the like), and/or other like communication devices. The communication devices 210 may permit the third party 202, the corporation 204, the depositary 206, the employee 207 and/or the investor 208 to communicate between/among each other through one or more communication media 212, such as by use of electronic mail communication through one or more computer systems, for example. The communication media 212 can include, for example and without limitation, wireline communication means such as a wireline server 212A, a wireless data network 212B, and/or a connection through a networked medium or media 212C (e.g., the Internet). In addition, the third party 202 (as well as any one or more of the corporation 204, the depositary 206, the employee 207 and/or the investor 208) can be operatively associated with one or more data processing/storage devices 214.

As illustrated in FIG. 3, the third party 202 can be operatively associated with a transaction computer system 214A, for example, and/or one or more data storage media 214B that can receive, store, analyze and/or otherwise process data and other information in association with communications that occur between/among the third party 202, the corporation 204, the depositary 206, the employee 207 and/or the investor 208.

In another aspect, the corporation 204 can be operatively associated with one or more computer systems 204A and/or one or more data storage media 204B. In another aspect, the depositary 206 can be operatively associated with one or more computer systems 206A and/or one or more data storage media 206B. In another aspect, the employee 207 can be operatively associated with one or more computer systems 207A and/or one or more data storage media 207B.

In another aspect, the investor 208 can be operatively associated with one or more computer systems 208A and/or one or more data storage media 208B. It can be appreciated that one or more of the computer systems (e.g., 204A, 206A, 207A, 208A, 214A) and one or more of the data storage media (e.g., 204B, 206B, 207B, 208B, 214B) can be employed to communicate, store, analyze, and/or otherwise process data related to financial transactions occurring between and/or among the third party 202, the corporation 204, the depositary 206, the employee 207 and/or the investor 208.

In one implementation, one or more elements of the system 200 may function as an issuing agent (e.g. underwriter) for issuing a straight debt security to a holder and/or a remarketing agent for offering, on one or more remarketing dates. In one embodiment, the system 200 may be configured to store and modify the securities. For example, data entries within the system may expire or convert at a certain time for remarketing.

The benefits of the present methods, systems and computer-readable media are readily apparent to those skilled in the art. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves. The various portions and components of various embodiments of the present invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A computer-implemented method supporting the issuance and remarketing of a straight, non-convertible debt security, comprising the steps of:

using a transaction computer system and one or more data storage media, creating a projected payment schedule for the debt security, wherein creating the projected payment schedule comprises calculating projected contingent payments for the debt security based on one or more of forward rates and expected values of contingent payments as of the debt security's issue date;

using the transaction computer system and one or more data storage media, calculating adjustments based on differences between the projected contingent payments and actual contingent payments; and using the transaction computer system and one or more data storage media, at one of a plurality of remarketing dates for the debt security, determining a yield for a next time period based on a benchmark interest rate in effect at least three months earlier than a current, remarketing date, and calculating a plug rate based on the determined yield for the next time period and a total yield that is associated with the debt security for a period beginning at the current remarketing date and ending at, a subsequent remarketing date, wherein the plug rate represents a yield associated with the debt security over a remainder time period beginning after the next time period and ending at the subsequent remarketing date.

2. The method of claim 1, further comprising calculating a comparable yield based on a yield of a fixed-rate debt instrument based on a maturity term of the debt security.

3. The method of claim 1, wherein if the actual contingent payments exceed the projected contingent payments, a positive adjustment is made.

4. The method of claim 1, wherein if the actual contingent payments are less than the projected contingent payments, a negative adjustment is made.

5. The method of claim 1, wherein the next time period begins on the remarketing date and ends three months after the remarketing date.

6. The method of claim 5, wherein the subsequent remarketing date is one year after the current remarketing date.

7. The method of claim 1, wherein the projected payment schedule further comprises non-contingent payments.

8. The method of claim 1, further comprising, using the transaction computer system and one or more data storage media, determining the interest amount for an accrual period based on a comparable yield and a calculated tax adjusted issue price of the debt security as of the beginning of the accrual period.

9. The method of claim 1, further comprising, using the transaction computer system and one or more data storage media, at a date the debt security is no longer outstanding, determining a tax adjusted issue price of the debt security, determining a value delivered to holders of the debt security, and calculating the difference between the tax adjusted issue price and the value.

* * * * *